(No Model.)
B. J. WHEELOCK.
ELECTRIC BATTERY CELL.
No. 506,353. Patented Oct. 10, 1893.
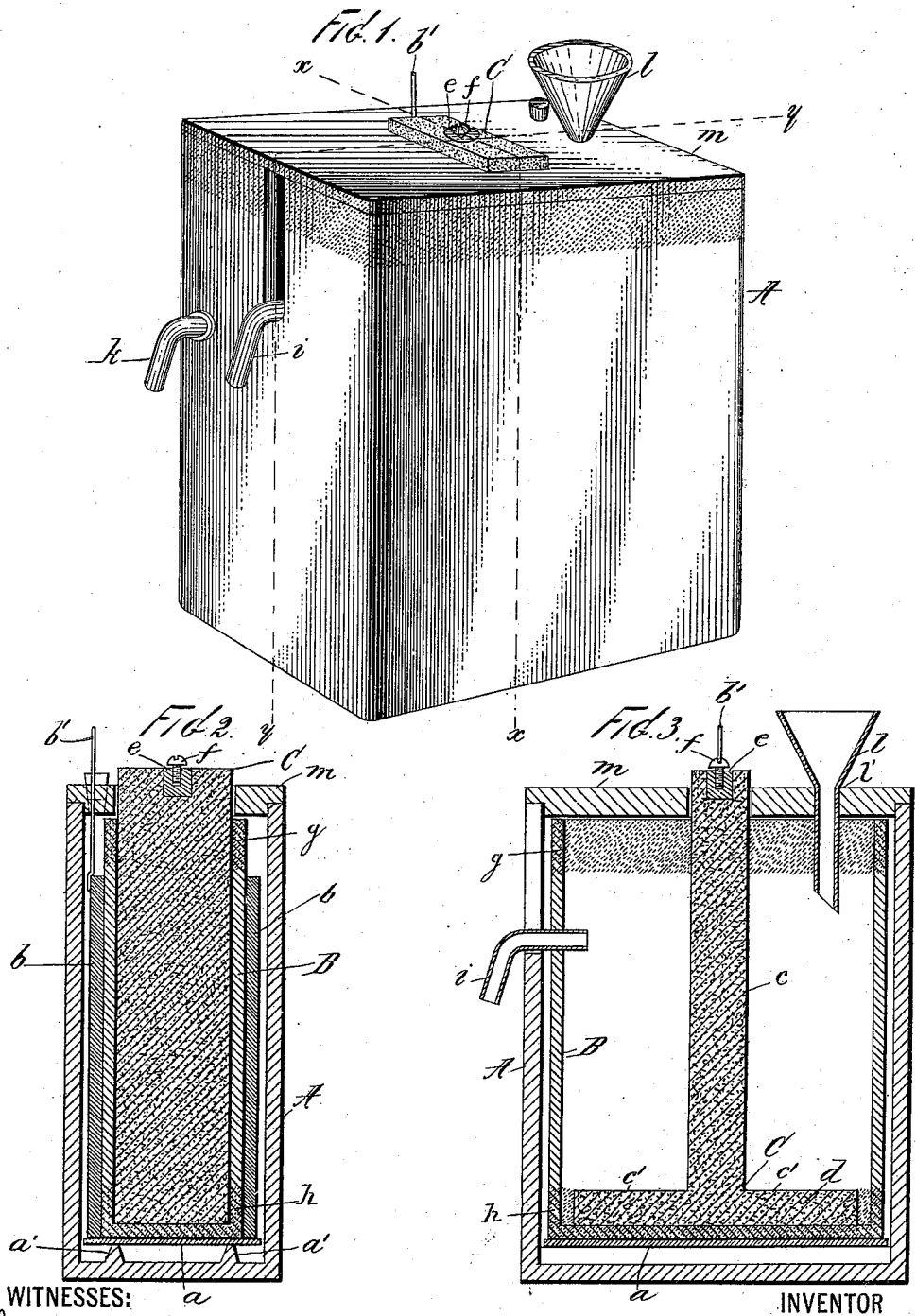
WITNESSES:
John Buckler
Geo. Smallwood
INVENTOR
Bloomfield J. Wheelock,
BY
Wm. H. Appleman.
ATTORNEY

UNITED STATES PATENT OFFICE.

BLOOMFIELD J. WHEELOCK, OF NEW YORK, N. Y.

ELECTRIC-BATTERY CELL.

SPECIFICATION forming part of Letters Patent No. 506,353, dated October 10, 1893.

Application filed September 23, 1892. Serial No. 446,697. (No model.)

*To all whom it may concern:*

Be it known that I, BLOOMFIELD J. WHEELOCK, a citizen of the United States, and a resident of New York, county of New York, and State of New York, have invented certain new and useful Improvements in Electric-Battery Cells, of which the following is a specification.

My invention, while relating in some of its details to electric battery cells in general, has reference more particularly to that form of such cell in which a zinc and carbon couple is employed, the individual elements of which are each immersed in its own particular electrolyte that is contained in a separate cup. In cells of this character, as heretofore constructed, it has been considered essential to the attainment of the highest degree of efficiency that the carbon element should present the greatest possible surface to the action of the electrolyte, and this has been accomplished in most cases by making such element as large as the interior capacity of its holding cup would warrant. To further increase this surface however the exterior of the element has, in some instances, been corrugated, in others such element has been perforated, whereby to permit of the electrolyte circulating therethrough, while in still others both of these arrangements have been employed together. Again, in cells of this character, as heretofore constructed, the walls of the carbon element have been so disposed that the hydrogen set free by the decomposition of the electrolyte, due to the action of the electric current thereon, has been formed upon the vertical portions thereof where it has accumulated in the form of a film, the result of which has been to cause this carbon element to become what is known in the art as "polarized," or, in other words, to set up, in consequence of the electro positive character of the hydrogen, a counter current in an opposite direction to that of the cell proper, thereby impairing, to the extent of the electro motive force of such counter current, the efficiency of the cell. To obviate this defect and prevent the polarization of such element, it has been found necessary in practice to employ means which would cause the hydrogen film to be either carried off as fast as it was formed, or else by entering into combination with it to extinguish the same.

I have discovered by experiment that, instead of the efficiency of the cell being increased by the employment of a carbon element of such extended dimensions, not only are the best results attained when that element is very greatly reduced in size, provided that it is properly arranged in connection with the other parts of the cell, but also that by making this carbon element of the proper shape, the polarization of the same may be prevented, without the use of other means, and the maximum efficiency of the cell at all times thereby maintained.

To these ends, my invention consists first, in the peculiarities of construction of the carbon element itself; second, in the peculiarities of construction of the porous cup whereby it is made stronger and the liability of breakage during handling and otherwise greatly reduced; third, in various combinations of the carbon element with the other parts of the cells, and fourth, in sundry other constructions, arrangements and combinations of parts, all as will hereinafter more fully appear.

Referring to the accompanying drawings which form a part of this specification, Figure 1, is an isometric projection of a cell embodying my invention, Fig. 2, a transverse vertical section thereof taken in the plane $x$ $x$ of Fig. 1, and Fig. 3, a longitudinal vertical section of the same likewise taken in the plane $y$ $y$ of said figure.

In all the figures like letters of reference are employed to designate corresponding parts.

A indicates the outer cup or receptacle in which the various parts of the cell with the appropriate electrolytes are contained. This cup or receptacle may be made of rubber, glass, or other suitable material and of any desired form. In the drawings however, I have shown it as made of a rectangular contour, and this is the form I prefer in practice. Arranged within this outer cup or receptacle A, is the inner cup B, which is made of some porous material, such, for instance, as unglazed porcelain, and, in my preferred form of construction, it is treated by being heated and then subjected to the action of melted wax, as described and claimed in United States Letters Patent No. 386,569, which were granted to me July 24, 1888, whereby to reduce its porosity and prevent it from disintegration when in use. The dimension of this cup B is somewhat smaller than the interior of the cup A; and, as disposed therein, it rests with its bottom upon a zinc plate $a$, which is made as large or somewhat larger than such bottom, and is, in turn, preferably supported upon projections or ribs $a'$ $a'$, extending upwardly from the bottom of the outer cup A, as shown, whereby to permit of the electrolyte, contained in this last mentioned cup, circulating thereunder. Resting upon this zinc plate $a$, in contact with, or in close proximity to, the outside walls of the cup B, are additional zinc plates, $b\, b$, which are disposed in a vertical position, and are made of a size substantially equal to that of the walls of the cup against which they are arranged. These plates, with the plate $a$ upon which they rest, constitute the zinc element of the couple, and in practice are, with such plate, preferably made from zinc which has been rolled to the proper degree of thinness.

Secured to one of the plates $b\, b$ is a connection $b'$, by means of which the zinc element of the cell may be connected to any convenient conductor. In the drawings, I have shown but a single one of these plates as thus equipped, and this I have found sufficient in practice, since the result of resting both of these plates upon the plate $a$, with which they are in electrical contact, is to practically form with it, so far as the current is concerned, but a single element which is unitary in its operation; but it is obvious that both of these plates may be similarly provided with these connections if found desirable. The plates $a$ and $b\, b$, after having been formed, are preferably amalgamated, as is now common, to avoid local action between the zinc proper and the impurities contained therein. A single amalgamation however is all that will be required during the life of such plates, as the plate $a$ prevents the loss of the mercury made use of in the amalgam, and thereby obviates a repetition of the amalgamation process as is now demanded in cells of this character as hitherto constructed.

Disposed within the cup B, is the carbon element C, which is made with a vertical portion $c$ and horizontal portion $d$. This element may be made in various forms, as, for instance, in the form of a letter L, it only being essential that it be composed of a vertical and a horizontal portion. I prefer however to make it of the form of an inverted T, as shown in the drawings. As thus constructed, it is arranged in the cup with the horizontal portion resting on the bottom thereof and with its vertical portion extending upward to, or slightly above, the top of such cup, where it is provided with means whereby the end of any convenient conductor may be readily secured thereto. The means which I find the cheapest and most convenient for effecting this securement consists of a soft metal block $e$, which is cast in a suitable recess formed in the upper end of such vertical portion, and a screw $f$, around which the end of the conductor may be passed, fitted to a suitable threaded orifice found in this block as shown, but any other form of connection may be used for this purpose, as, for instance, the usual clamp and binding post.

In practice the horizontal portion $d$ of the element C will preferably be made of an area substantially equal to that of the bottom of the cup upon which it is arranged, and of a thickness or depth approximating about one twelfth or one fourteenth of the depth of such cup, while the vertical portion $c$ thereof will be made of a thickness approximating about one sixth or one seventh of the length of the cup. In addition to these dimensions, the horizontal and vertical portions of the element will be made of a width approximately equal to the interior width of the cup in which they are arranged, in order that they may be in contact with its walls, or substantially so, and in as close relation to the zinc plates $b\, b$ as is possible to reduce the internal resistance of the cell to the minimum. By thus making the carbon element with a vertical and a horizontal portion, a horizontal surface $c'$, is provided upon the upper side of the latter above and in connection with which, as with the vertical surface of the former, the decomposition of the containing electrolyte takes place; and the hydrogen set free by this decomposition, in rising past the walls of the vertical portion of the element, serves, by the aid of the heat evolved by the electrolysis, to sweep off and carry with it the film of hydrogen that tends to accumulate upon the walls of the vertical portion of the element, thereby preventing the polarization of this element and maintaining it at all times in condition for the most efficient operation. In addition, also, to thus preventing the polarization of this element, and thereby increasing the efficiency of the cell, the reduction of the size of such element materially reduces the cost of the same.

To strengthen the interior or porous cup B at its top and bottom, whereby to prevent it from fracture while being handled or otherwise, I find it convenient to saturate these portions by immersing them in a boiling composition, composed of one part of paraffine and two parts of ozokerite until they are thoroughly saturated therewith. They are then withdrawn from the composition and allowed to cool, after which they are again immersed in the same composition reduced to a temperature slightly below the boiling point and again withdrawn immediately thereafter. This last immersion leaves a heavy coating upon the portions of the cup that have been immersed, as shown respectively at $g$ and $h$, which, upon cooling, hardens to a degree that substantially increases the strength of the cup, and prevents all capillary action of the electrolyte and the climbing of the salts. The distance down from the top of the cup to which I carry this hardening process, as well as the distance up from the bottom thereof to which it may be applied, may be varied as circumstances may require and the judgment of the constructer may suggest. I prefer however to carry it down from the top to a distance of about one inch, and up from the bottom to about one-fourth of that distance, as this leaves the necessary portion of the walls of the cup free for the proper action of the osmose force, and avoids the action of the electrolytes upon the zinc plate $a$ in the bottom of the outer cup or receptacle A.

In order to remove the spent electrolytes from the cups, I make use of the tubes $i\ k$, the former of which is connected with the inner cup B, and the latter with the outer cup A. These tubes are inserted at the proper distance from the bottom of their respective cups, and may be either straight or have their outer ends bent downward as desired. I prefer however to have their outer ends bent downward as shown, and to have the tubes so arranged in their respective cups as to be rotatable therein, as provision is thereby made for varying the height of the electrolytes by simply rotating the tube in the proper direction, and either filling the cups or withdrawing the fluids, as may be desired. This arrangement, as will be seen, is much more convenient than the ordinary one of employing a siphon, and saves much time and labor in replenishing the cups.

In addition to the tubes $i$ and $k$, I sometimes find it advantageous to employ a third tube $l$, through which the electrolytes may be supplied to their respective cups. This tube may be made of a funnel shape if desired, and, in practice, will be fitted to a hole $l'$ suitably located in the cover $m$ of the cup or receptacle A, to permit of the electrolytes being supplied to the outer or inner cup as the exigencies may require.

The carbon element, although not deemed essential, is preferably secured permanently in the porous cup; and where it comes in contact with the clamp or other connection by means of which the conductor is secured thereto, it is preferably saturated with boiling paraffine to prevent corrosion.

The parts being constructed as above described, the cups charged with the proper solution, and the circuit closed, a strong and uniform current of electricity will be generated which will not appreciably diminish in strength so long as the electrolytes remain unexhausted. On the other hand, when such circuit is broken and the cell is at rest, there will be no wastage of the material or change therein that will impair the operation of the cell when the circuit is again established.

In charging the cell, I prefer to employ in the outer cup or that in which the zinc element is immersed, an electrolyte composed of one part of sulphuric acid and twenty parts of water; and in the inner cup, or that containing the carbon element, an electrolyte composed of nitric acid, sulphuric acid, water, sal ammoniac, bichromate of potash or bichromate of soda, and sulphate of iron, as, and in the proportion, set forth and described in United States Letters Patent No. 385,028, which were granted to me June 26, 1888, but any other forms of electrolytes may be employed in lieu thereof and still be within the scope of my invention.

In the foregoing, I have described the best means contemplated by me for carrying my invention into practice, but I wish it understood that I do not limit myself strictly thereto, as it is obvious that I may modify the same in many of its details without departing from the spirit of the invention claimed.

Having thus described my invention and one way in which it is or may be carried into effect, what I claim as new, and desire to secure by Letters Patent of the United States, is—

1. The combination with a porous cup, and a carbon element constructed with a vertical and horizontal portion arranged therein, of a zinc element arranged upon the sides and under the bottom of said cup, substantially as described.

2. The combination with a porous cup, and a carbon element constructed of an approximately inverted T form arranged therein, of a zinc element composed of three plates, one of which is arranged under the bottom of said cup, and the two others upon the sides thereof in electrical contact with the first, substantially as described.

3. The combination with a porous cup, a carbon element constructed of an approximately inverted T form arranged within the same, and a zinc element composed of three plates one of which is arranged beneath the cup and the others upon the sides thereof in electrical contact with the first, of an outer cup or receptacle in which the porous cup is arranged, substantially as described.

4. The combination with the porous cup, a carbon element constructed of an approximately inverted T form arranged within the same, and a zinc element arranged upon the sides and under the bottom of said cup, of an outer cup or receptacle in which the porous cup and the carbon and zinc elements are disposed, and appropriate electrolytes contained in said cups, substantially as described.

5. A porous cup for electric battery cells, constructed with its upper and lower edges hardened by the application of paraffine and ozokerite thereto, substantially as described.

In testimony whereof I have hereunto set my hand this 25th day of May, 1892.

BLOOMFIELD J. WHEELOCK.

Witnesses:
SYLVANUS L. TRIPPE,
GEO. F. TREFCER.